Patented Aug. 17, 1926.

1,596,760

UNITED STATES PATENT OFFICE.

CLARENCE A. NASH, OF MILWAUKEE, WISCONSIN, ASSIGNOR TO THE CUTLER-HAMMER MFG. CO., OF MILWAUKEE, WISCONSIN, A CORPORATION OF WISCONSIN.

PLASTIC COMPOSITION MATERIAL.

No Drawing. Application filed July 19, 1920. Serial No. 397,181.

This invention relates to improvements in plastic composition material particularly adapted to electrical insulating purposes.

In prior Patent No. 1,233,416, granted July 17, 1917 to William H. Steinberg, is disclosed a composition material comprising an inert base or filler, a polymerizing or vulcanizing agent and a binder including coal tar pitch, stearine pitch, an animal or vegetable oil capable of polymerization, and a solvent of high boiling point, together with a method of combining the aforestated ingredients.

This composition has proven of great value commercially and has marked a decided advance and improvement in the art, and the present invention has among its objects that of providing a further improvement in such materials and in the method of production thereof.

Other objects and advantages will hereinafter appear.

More particularly, said former method contemplates the use of a binder including coal tar pitch and stearine pitch, preferably in substantially equal parts which are mixed in the presence of heat from 400 to 500 degrees F. until the free carbon thereof precipitates. Then while said pitches are heated, an animal or vegetable oil capable of vulcanization or polymerization, preferably castor oil, is added thereto in the proportion of 10% of the combined weight of the pitches after precipitation of the carbon, such proportions being, however, capable of variation. After addition of the aforesaid oil, the supernatant liquid is drawn off and cooled and a volatile solvent, preferably benzol, is added thereto to complete the binder, the percentage of benzol being preferably equal to 50% of the liquid to which it is added, this proportion likewise being capable of variation.

Also according to such prior method, the binder constituted as aforestated is mixed with an inert filler such as comminuted asbestos together with a vulcanizing or polymerizing agent such as sulphur, the resulting compound subjected to a quick molding operation and subsequently cured by prolonged heat treatment after removal from the molds.

According to the present invention, it is proposed to substitute for a portion of the coal tar pitch an asphaltic body such, for example, as gilsonite, glance pitch, manjak, grahamite, or other asphaltics which substitution has been found in practice to effect important changes in physical properties of the composition product, among which changes may be mentioned improvement in heat resistive and electrical insulating qualities as well as somewhat increased hardness, homogeneity and mechanical strength. Also such substitution has been found to provide a product which is more readily molded to the desired form and whereof the molded articles present an improved finish and general appearance. Also by varying the proportion of the asphaltic body so substituted it has been found possible, while maintaining substantially uniform physical properties of the finished product, to vary the consistency and other properties of the molding compound within relatively wide ranges to thereby adapt the same to the formation of molded pieces which vary widely in form, dimensions and other properties and hence require specifically different molding conditions.

According to a preferred method of preparing the foregoing composition, coal tar pitch, stearine pitch and gilsonite are slowly heated to a temperature of about 500 degrees F. with stirring during the melting period to secure uniform mixture. Such stirring is particularly necessary since the gilsonite has a higher melting point than the pitches and also a lower specific gravity than the molten pitches, thus tending to float at the top of the mix whereby melting thereof might be retarded.

After reaching the aforementioned temperature it is advantageous to maintain such temperature for a period of from one to three hours after which the mixture is permitted to cool to a temperature of about 470 degrees F., at which temperature castor oil is added and the mixture again thoroughly stirred.

Subsequently the mass is permitted to cool to about 250 degrees F. at which temperature a quantity of benzol or other similar solvent is added.

An indefinite amount of free carbon is ordinarily present in commercial coal tar pitch and also to a lesser degree in stearine pitch, such free carbon being precipitated during the foregoing treatment and upon completion of such treatment the mass is permitted to stand for several hours to permit such precipitated carbon to settle whereupon the supernatant compound is removed for use as a binder.

The quantity of such free carbon ordinarily varies from 20% to 40% of the weight of the coal tar pitch used.

Following the aforementioned removal of the carbon a small quantity of paraffin oil may be added, the tendency thereof being to maintain the binder in a moist condition particularly where an appreciable time intervenes between preparation and use of the binder, the amount of parffin oil moreover varies with the consistency of the binder and to some extent with temperature and climatic conditions.

Other asphaltics such as glance pitch, manjak or grahamite may be substituted for the gilsonite aforementioned. Similarly the castor oil may be substituted by china wood oil or other vegetable or animal oil, whereas the benzol may be replaced wholly or in part by a high boiling point naphtha of analogous solvent characteristics.

A typical mix for the foregoing binder may be made in the following proportions: Stearine pitch, 400 lbs. (50%); coal tar pitch, 280 lbs. (35%); gilsonite, 120 lbs. (15%); castor oil, 64 lbs. (approx. 10% of the foregoing after deduction for loss of precipitated carbon); benzol, 200 lbs.; paraffin oil, (1 to 10% by weight depending upon the condition of the material with respect to dryness and other conditions).

A molding compound comprising the foregoing binder may be made advantageously by combining 150 lbs. of disintegrated asbestos with 37 to 40 pounds of such binder together with 9 lbs. of a suitable vulcanizing or polymerizing agent such as sulphur, the asbestos and sulphur being first mixed in a kneading machine together with a small amount of benzol or other similar solvent which is adapted during such treatment to moisten the asbestos thereby facilitating and expediting a thorough impregnation of the latter with the subsequently added binder. After addition of the binder the foregoing constituents are subjected to a further kneading treatment continuing preferably from 30 to 45 minutes or until a homogeneous mixture is effected. During such treatment a small quantity of benzol may be added if the material appears unduly dry or otherwise refractory.

During such mixing process the material forms in small balls or granules which are thereafter disintegrated and screened to the proper mesh the composition being thereafter in suitable condition for subjection to a quick molding operation followed by prolonged heat treatment after removal from the mold.

Such molding operation may be performed at ordinary or room temperature in a few seconds and is preferably effected under a pressure of from 5,000 to 15,000 lbs. per square inch, the molded article being thereafter sufficiently firm to be removed from the die and to withstand any tendency toward warping during subsequent heat treatment.

Such heat treatment may vary in accordance with the requirements of pieces of differing size and contour and is also influenced by the presence or absence of metallic inserts. The maximum temperature should not greatly exceed 550 degrees F. and the treatment may extend over a period varying from 10 to 24 hours dependent upon the foregoing and other variable conditions.

Fillers other than asbestos may under most conditions be used, such substitute fillers optionally comprising wood fibre, mica, flock and others. The proportions of binder employed with different fillers will ordinarily vary somewhat from that aforestated.

While the foregoing compound has been described as particularly adapted to quick molding at ordinary temperatures followed by heat treatment, it is nevertheless to be understood that the utility of the compound is not limited to such treatment. On the other hand such compound is well adapted to molding at more or less elevated temperatures, in which cases either the compound or the die or both may be preheated and maintained at the desired temperature by any of the means known in the art. However in any case, the final cure may be most advantageously effected by prolonged heat treatment after removal from the mold.

What I claim as new and desire to secure by Letters Patent is:

1. A composition material for the purposes stated comprising stearine pitch, coal tar pitch an asphaltic body and a relatively inert filler material.

2. A molded body comprising stearine pitch, coal tar pitch and an asphaltic body.

3. A binder for the purposes stated including stearine pitch, coal tar pitch, an asphalitic body, and a volatile solvent therefor.

4. A binder for the purposes stated comprising stearine pitch, coal tar pitch, an asphaltic body, a volatile solvent therefor and an oil capable of polymerization.

5. A binder for the purposes stated including a mixture of reduced free carbon content, of coal tar pitch, stearine pitch, an asphaltic body and an oil capable of vulcanization or polymerization, together with a volatile solvent.

6. A composition of the character stated including a filler having mixed therewith a vulcanizing or polymerizing agent and a binder for said filler including stearine pitch, coal tar pitch, an asphaltic body and an oil capable of vulcanization or polymerization.

7. A composition of the character stated including comminuted asbestos and sulphur and a binder composed of a mixture of coal tar pitch and stearine pitch of materially reduced free carbon content, an asphaltic body and an oil capable of vulcanization or polymerization mixed with a volatile solvent.

8. A formed and indurated body comprising as constituents stearine pitch, coal tar pitch, an asphaltic body and a relatively inert filler.

9. The process of producing a plastic composition binder, which comprises mixing together, under heat, stearine pitch and an asphaltic body and incorporating therewith a volatile solvent.

10. The process of producing a plastic composition binder, which comprises mixing together, under heat, stearine pitch, coal tar pitch and an asphaltic body and incorporating therewith a volatile solvent.

11. The process of producing a plastic composition, which comprises mixing together, under heat, stearine pitch, coal tar pitch and an asphaltic body and incorporating therewith a volatile solvent, and a relatively inert filler material.

12. The herein described method which comprises combining, under heat, coal tar pitch, stearine pitch and an asphaltic body together with an oil capable of vulcanization or polymerization.

13. The herein described method which comprises combining, under heat, coal tar pitch, stearine pitch, an asphaltic body and an oil capable of vulcanization or polymerization and thereafter incorporating therein a volatile solvent.

14. The herein described method which comprises combining, under heat, coal tar pitch, stearine pitch, and an asphaltic body, accompanied by stirring until the free carbon thereof is precipitated, effecting separation of such precipitated carbon and combining with the residue in the presence of heat an oil capable of vulcanization or polymerization.

15. The herein described method which comprises combining, under heat, coal tar pitch, stearine pitch and gilsonite accompanied by stirring until the free carbon thereof is precipitated, effecting separation of such carbon, thereafter combining with the residue in the presence of heat an oil capable of vulcanization or polymerization, subsequently cooling the resultant product and adding thereto a volatile solvent.

16. The herein described method which comprises combining, under heat, coal tar pitch, stearine pitch and an asphaltic body, cooling the mixture and adding thereto an oil capable of vulcanization or polymerization, subsequently effecting further cooling of the resultant product and adding thereto a volatile solvent to form a binder, incorporating in such binder a filler together with a vulcanizing or polymerizing agent, subjecting such mixture to a quick molding operation at ordinary temperatures and finally subjecting the molded product to prolonged heat treatment after removal from the mold.

In witness whereof, I have hereunto subscribed my name.

CLARENCE A. NASH.